United States Patent
Byron et al.

(10) Patent No.: US 10,909,303 B2
(45) Date of Patent: *Feb. 2, 2021

(54) ADAPTING TABULAR DATA FOR NARRATION

(71) Applicant: International Business Machines Corporation, Armonk, NY (US)

(72) Inventors: Donna Karen Byron, Boston, MA (US); Alexander Pikovsky, Laxington, MA (US); Matthew B. Sanchez, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/271,232

(22) Filed: Feb. 8, 2019

(65) Prior Publication Data

US 2019/0171692 A1    Jun. 6, 2019

Related U.S. Application Data

(63) Continuation of application No. 14/089,953, filed on Nov. 26, 2013, now Pat. No. 10,303,741, and a continuation of application No. 13/838,130, filed on Mar. 15, 2013, now Pat. No. 10,289,653.

(51) Int. Cl.
| | |
|---|---|
| *G06F 40/103* | (2020.01) |
| *G06F 40/56* | (2020.01) |
| *G06F 40/177* | (2020.01) |

(52) U.S. Cl.
CPC .......... *G06F 40/103* (2020.01); *G06F 40/177* (2020.01); *G06F 40/56* (2020.01)

(58) Field of Classification Search
CPC ....... G06F 40/103; G06F 40/56; G06F 40/177
See application file for complete search history.

(56) References Cited

U.S. PATENT DOCUMENTS

| | | | | |
|---|---|---|---|---|
| 10,289,653 | B2 * | 5/2019 | Byron | ..................... G06F 40/56 |
| 10,303,741 | B2 * | 5/2019 | Byron | ................... G06F 40/103 |
| 2004/0117739 | A1 * | 6/2004 | Challenger | ............. G06F 16/84 |
| | | | | 715/251 |
| 2007/0179776 | A1 * | 8/2007 | Segond | ................. G06F 40/211 |
| | | | | 704/9 |
| 2011/0301941 | A1 * | 12/2011 | De Vocht | .............. G06F 40/216 |
| | | | | 704/9 |

* cited by examiner

*Primary Examiner* — Scott T Baderman
*Assistant Examiner* — Steve P Golden
(74) *Attorney, Agent, or Firm* — Garg Law Firm, PLLC; Rakesh Garg; Reza Sarbakhsh (57) ABSTRACT

A method, system, and computer program product for adapting tabular data for narration are provided in the illustrative embodiments. A set of categories used to organize data is identified in a first tabular portion of a document. A structure of the categories is analyzed. An inference is drawn about data in a first cell in the first tabular portion based on a position of the first cell in the structure. The first tabular portion of the document is transformed into a first narrative form using the inference.

25 Claims, 5 Drawing Sheets

| REVENUES 312 | GOVERNMENTAL FUND TYPES 304 | | |
|---|---|---|---|
| | GENERAL 306 | SPECIAL REVENUE 308 | DEBT SERVICE 310 |
| | 318 $ | 320 $ | 322 $ |
| TAXES | 324  64,050 | 75,138 | |
| LICENSES AND PERMITS | 58,606 | | |
| INTERGOVERNMENTAL | 14,427 | 17,466 | 726 |
| CHARGES FOR SERVICES | 18,242 | 482 | 8 |
| INDIRECT COST RECOVERY | 7,392 | | |
| INVESTMENT INCOME | 6,606 | 576 | 3292 |
| MISCELLANEOUS | 259 | 2,663 | |
| 316 { TOTAL REVENUES 314 | 166,582 | 96,325 | 4,026 |

APPLICATION 502

ANALYZE 504

STRUCTURE IDENTIFICATION 506

INFERENCES 508

CROSS-REFERENCES 510

ADAPTING TABULAR DATA FOR NARRATION

BACKGROUND

1. Technical Field

The present invention relates generally to a method, system, and computer program product for natural language processing of documents. More particularly, the present invention relates to a method, system, and computer program product for adapting tabular data for narration.

2. Description of the Related Art

Documents include information in many forms. For example, textual information arranged as sentences and paragraphs conveys information in a narrative form.

Some types of information are presented in a tabular organization. For example, a document can include tables for presenting financial information, organizational information, and generally, any data items that are related to one another through some relationship.

Natural language processing (NLP) is a technique that facilitates exchange of information between humans and data processing systems. For example, one branch of NLP pertains to transforming a given content into a human-usable language or form. For example, NLP can accept a document whose content is in a computer-specific language or form, and produce a document whose corresponding content is in a human-readable form.

SUMMARY

The illustrative embodiments provide a method, system, and computer program product for adapting tabular data for narration. In at least one embodiment, a method for adapting tabular data for narration is provided. The embodiment includes identifying, in a first tabular portion of a document, a set of categories used to organize data. The embodiment further analyzes a structure of the categories. The embodiment further draws an inference about data in a first cell in the first tabular portion based on a position of the first cell in the structure. The embodiment further transforms the first tabular portion of the document into a first narrative form using the inference.

In another embodiment, the transforming includes creating an inferential narrative, wherein the inferential narrative comprises inferences drawn using cells in different tabular portions of the document, the inferential narrative describing content not present in the different tabular portions.

In another embodiment, the transforming generates the first narrative form without using a template for a narrative sentence, and wherein the transforming includes determining a significance of the first cell relative to the first tabular data based on the position of the first cell in the structure. The embodiment further generates a part of the first narrative form using the determined significance of the first cell.

In another embodiment, the first cell does not include a value, wherein the first cell specifies a category, and wherein the first narrative form describes the category in the first cell.

In another embodiment, the drawing the inference further comprises cross-referencing the data in the first cell with data in a second cell in the first tabular portion.

In another embodiment, the cross-referencing further comprises using cross-referencing information created during transforming a second document.

In another embodiment, the drawing the inference further comprises cross-referencing the data in the first cell with data in a non-tabular portion of the document.

An embodiment further merges the first narrative form corresponding to the first tabular portion with a non-tabular portion of the document.

An embodiment further sends the narrative form of the first tabular portion of the document and a non-tabular portion of the document to a natural language processing engine.

An embodiment further receives the document, the document including a plurality of tabular portions, the first tabular portion being one of the plurality of tabular portions, each tabular portion organizing data using a different set of categories.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

The illustrative embodiments recognize that documents subjected to NLP commonly include tabular data, to wit, content in the form of one or more tables. Information presented as tabular data often relates to the content of the remainder of the document and aids in understanding the overall content of the document.

The illustrative embodiments recognize that tabular data requires specialized processing or handling for interpreting the tabular data correctly and completely. For example, tables include values in table cells that can be referenced using the cell's row and column position in the table. However, merely learning, reading, or interpreting the cell-value in isolation is insufficient to gain an understanding of the significance of the cell-value. Without also knowing the relationship between the cell-value and the organizational structure of the table in which it appears, one cannot understand the meaning of that cell-value.

As an example, cell-value "61,050" means just the number sixty one thousand and fifty if considered in isolation from the structure of the table in which the cell-value appears. However, as the illustrative embodiments recognize, knowing that the cell-value "61,050" appears in the classification of "Revenues," sub-classification of "Taxes," and in the "General" category, in a table that pertains to the finances of "Jefferson County" informs that General taxes portion of the revenue of Jefferson County is sixty one thousand and fifty Dollars. Generally, the narrative description generated by an embodiment is not limited to one or more isolated data cell values, but also includes natural language sentences exposing the inter-relationships among the values of descriptive cells, such as headers or table headings.

The illustrative embodiments recognize that because of the difficulty and complexity involved in interpreting tabular data, presently available NLP engines often ignore tabular data when processing documents that include tabular data. The knowledge of the tabular structure at issue, the inferences that can be drawn from the location of data within that structure, and the cross-referencing with other content in the document, are some example features that are necessary for correct or complete interpretation of tabular data. The illustrative embodiments recognize that these and other features are lacking in presently available NLP engines.

The illustrative embodiments used to describe the invention generally address and solve the above-described problems and other problems related to the limitations of presently available NLP technology. The illustrative embodiments provide a method, system, and computer program product for adapting tabular data for narration.

The illustrative embodiments discover the hierarchy, organization, or structure used for organizing tabular data in a document. The illustrative embodiments use a combination of heuristics and inferences, including but not limited to using the formatting or visual arrangement of the tabular data to transform tabular data into a narrative form that a NLP engine can consume.

An embodiment further cross-references tabular data with other information in the document, to interpret the meaning or significance of the tabular data in a correct or complete manner for the narrative form. An embodiment also uses relationship between data in a table or elsewhere in the document for the transformation to the narrative form.

An embodiment further generates information that is usable for cross-referencing with other tabular data, when the other tabular data is transformed to a corresponding narrative. An embodiment generates the narrative without the aid of external knowledge source such as dictionaries or ontologies. An embodiment further generates a narrative of a tabular data without using a template for the narrative in which the cell-values from the tabular data are simply plugged-in.

The illustrative embodiments are described with respect to certain documents and tabular data only as examples. Such documents, tabular data, or their example attributes are not intended to be limiting to the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
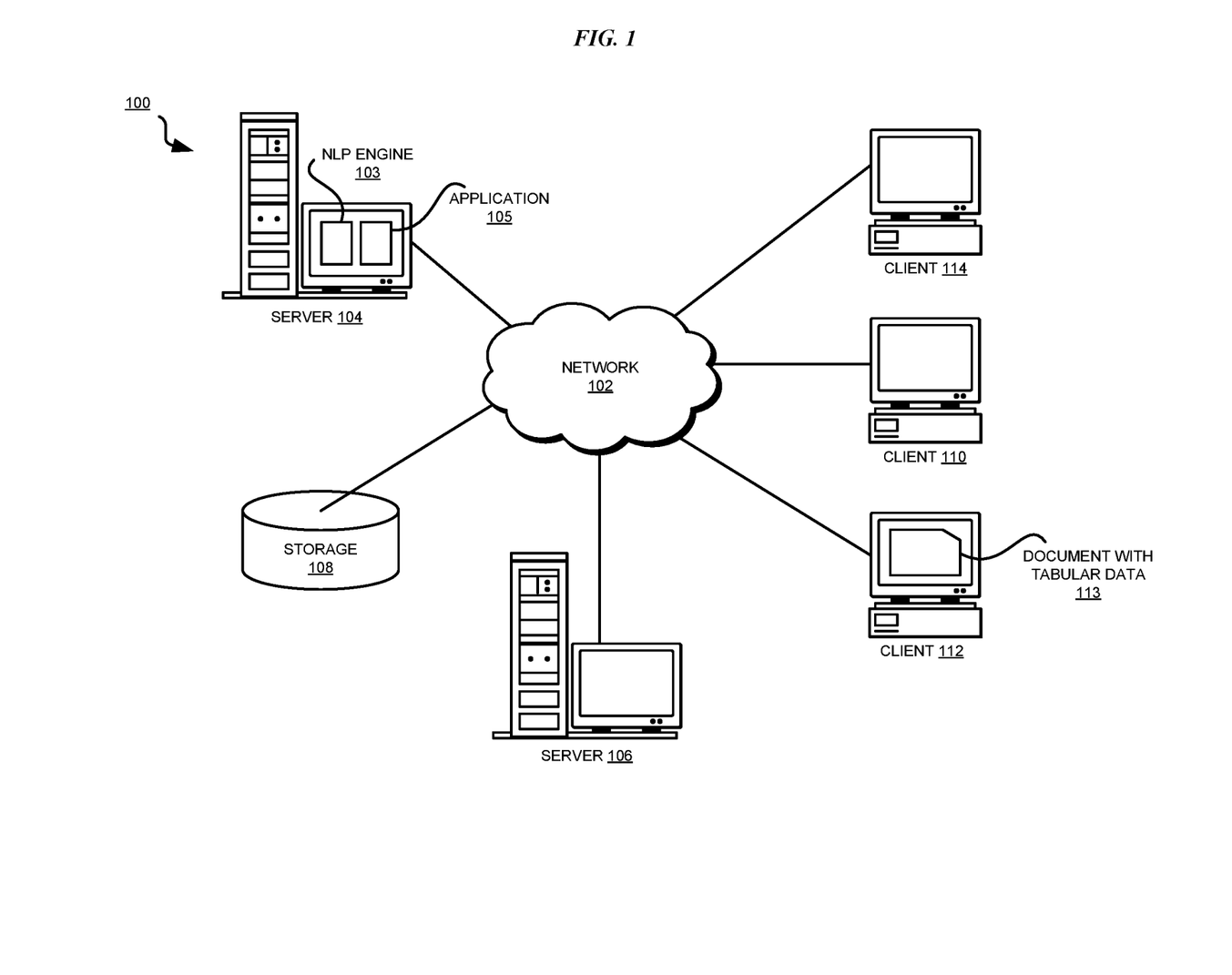
FIG. 1 depicts a pictorial representation of a network of data processing systems in which illustrative embodiments may be implemented.
Figure 2:
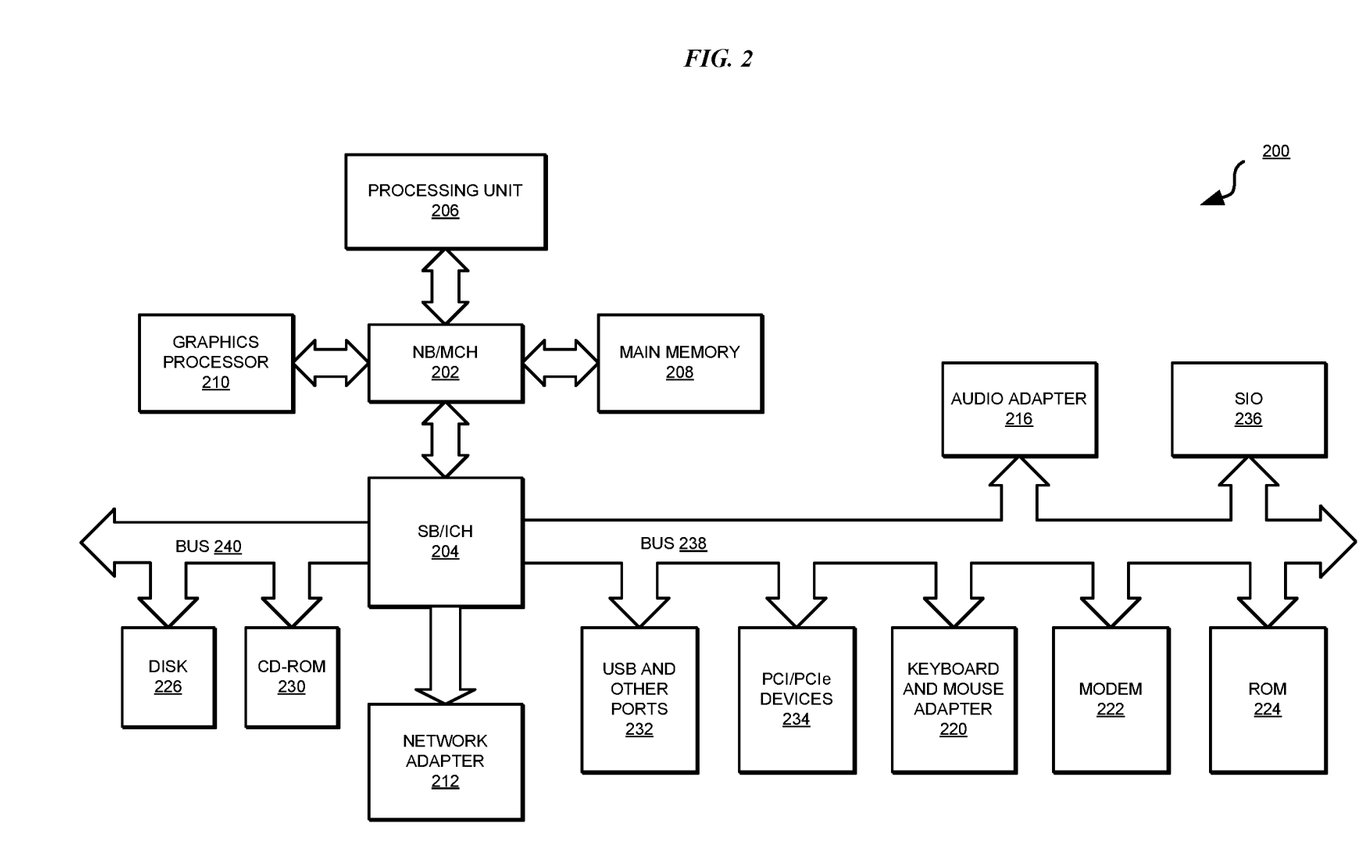
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, Application 105 in server 104 is an implementation of an embodiment described herein. Application 105 operates in conjunction with NLP engine 103. NLP engine 103 may be, for example, an existing application capable of performing natural language processing on documents, and may be modified or configured to operate in conjunction with application 105 to perform an operation according to an embodiment described herein. Client 112 includes document with tabular data 113 that is processed according to an embodiment.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 112 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive 226, CD-ROM 230, and other similarly usable devices are some examples of computer usable storage devices including computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on at least one of one or more storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
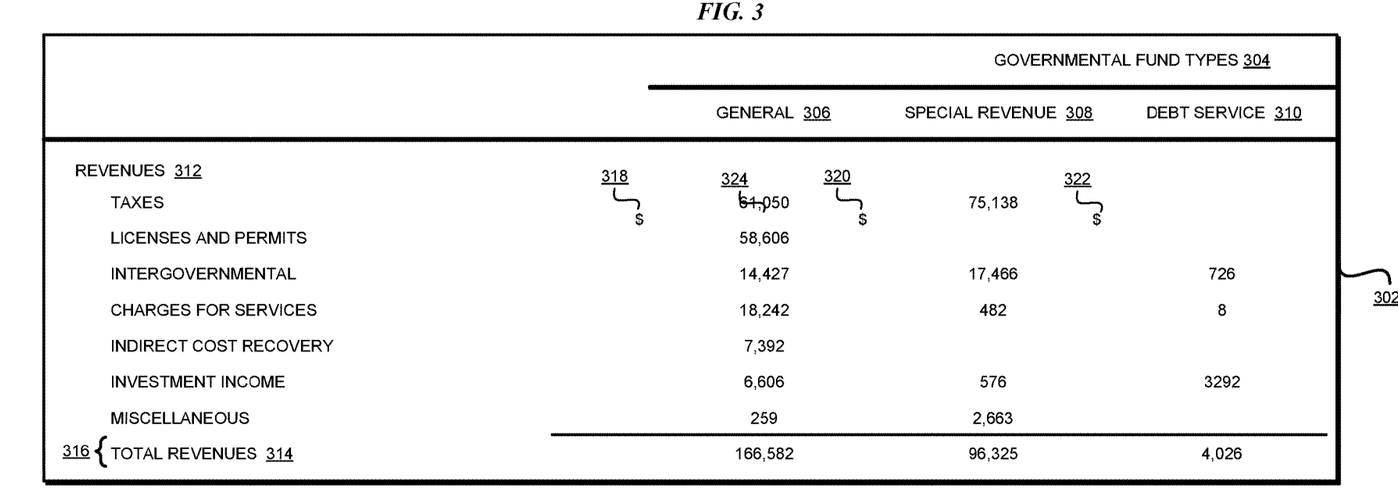
FIG. 3 depicts an example of tabular data that can be transformed into a narrative form in accordance with an illustrative embodiment.

With reference to FIG. 3, this figure depicts an example of tabular data that can be transformed into a narrative form in accordance with an illustrative embodiment. Table 302 is an example of tabular data appearing in document 113 in FIG. 1 and transformed into a narrative form using application 105 in FIG. 1.

Table 302 includes several headers that serve to organize the data in the various cells into headings, categories, or classifications (categories). The headers can be row-headers or column headers. For example, header 304 identifies a group of columns, which include data for the broad category of "government fund types". Headers 306, 308, and 310 identify sub-categories of the "government fund type" data. Header 312 indicates that the rows indented under header 312 belong to the "revenues" category. Similarly, header 314 informs that the data in row 316 pertains to the total revenue amounts in various sub-categories of the government fund types.

An embodiment identifies the presence of table 302 in a document. The embodiment recognizes the hierarchical structure formed under headers 304-310. The embodiment further recognizes that the rows indented under header 312 are to be interpreted as providing revenue information, of which the cells in row 316 are categorized totals as header 314 indicates.

The embodiment also recognizes that symbols 318, 320, and 322 apply to all cells in the columns under headers 306, 308, and 310 respectively. Accordingly, the embodiment determines that the values in the cells of table 302 are dollar amounts for different types of revenues under the various categories.

Elsewhere in a document (not shown), other content may indicate that table 302 relates to the finances of an entity, for example, "Jefferson County." An embodiment can use this contextual information to further describe the tabular data of table 302 in narrative form. Another embodiment can render the narration such that a table header becomes a section title in the narrative while individual narrated sentences become that section's body. Such an embodiment allows the statements to be naturally scoped according to the current document's subject.

While table 302 visually communicates the information contained therein in the above described form to a human reader, an existing NLP engine is unable to garner such details from table 302. An embodiment operating in conjunction with an NLP engine, such as NLP engine 103 in FIG. 1, transforms table 302 into narrative statements that describe the nature and significance of the tabular data along with the values of the tabular data in the manner described above.

For example, an embodiment transforming table 302 to a narrative form produces the following statement(s) for cell 324—"Taxes are a part of revenues for Jefferson County. The general type of government fund types has sixty one thousand and fifty dollars in revenues from taxes." In contrast, an existing solution for NLP might produce the following statement for cell 324—"sixty one thousand and fifty," or "dollar sixty one thousand and fifty," or at best, "taxes dollar sixty one thousand and fifty."

An embodiment utilizes the information contained in the hierarchical structure of the cells, including but not limited to headers in the given tabular data, to construct the complete statements. The embodiment traverses the hierarchy to determine dependencies between clauses or phrases in that hierarchy. The embodiment utilizes linguistic or grammatical knowledge available from any source to place and connect those clauses or phrases into a statement. Consequently, one advantage of the embodiment, as is evident from the above example, an embodiment constructs a complete sentence-like narrative statement where none of the existing statements provide a statement that is as complete as the example statement produced by the embodiment, or indicative of the significance of cell 324 as the embodiment.

In general, a cell can be identified by a combination of its row and column headers, and potentially, some extra context such as denominations. Thus, a cell is a 'tuple' as follows: <row category 1=row header 1, . . . row category n=row header n, col category 1=col header 1, . . . col category n=col header n, VALUE>.

Most tables include just one category of headers. In such common cases, the tuple becomes <row category 1=row header 1, col category 1=col header 1, VALUE>. For the example described above, the tuple becomes <Revenue=Taxes, Government fund types=General, $61,050>.

An embodiment uses this standard representation for natural language generation for representing cells. The embodiment then converts the semantic content of the attribute value matrix of the tuple to a corresponding natural language sentence. An embodiment can use any suitable natural language generation technique for the conversion. For example, some techniques for natural language generation utilize grammar rules from a human language, while some others are template-based where the values fill open slots in an underspecified sentence.

For the above described example, one embodiment uses a set of heuristics to narrate "Government fund types=General" as a Noun-Phrase (Government)type of (Government fund types), that is, as a noun phrase with prepositional complement. The example embodiment similarly narrates "Revenue=Taxes" as "Revenue from Taxes." The embodiment connects the two Noun Phrases above in one Noun Phrase by using a prepositional connector, i.e., "Revenues from taxes for General type of government fund types." Operating in this example manner, an embodiment composes the complete sentence as (subject, verb, object) where the subject is the qualifier statement above, verb is 'is,' and the object is the value of the cell. This operation produces the following narrative sentence, "Revenues from taxes for General type of government fund types are sixty one thousand and fifty dollars."

The above process is an example of techniques used in Natural Language Generation area of Natural Language Processing. An embodiment can employ any number of these and other similarly purposed techniques to generate natural text from semi-structured descriptions, such as in the example described above. Using a combination of these techniques, an embodiment might generate multiple alternative realizations from the same specification, while preserving natural language rules and constraints. An embodiment uses the available contextual information for a given cell, such as the hierarchy of the headers, the value in the cell, a denomination or unit information corresponding to the cell, and other similarly available contextual information with cells of tabular data, to narrate the information in the cell as a natural language sentence.

Figure 4:
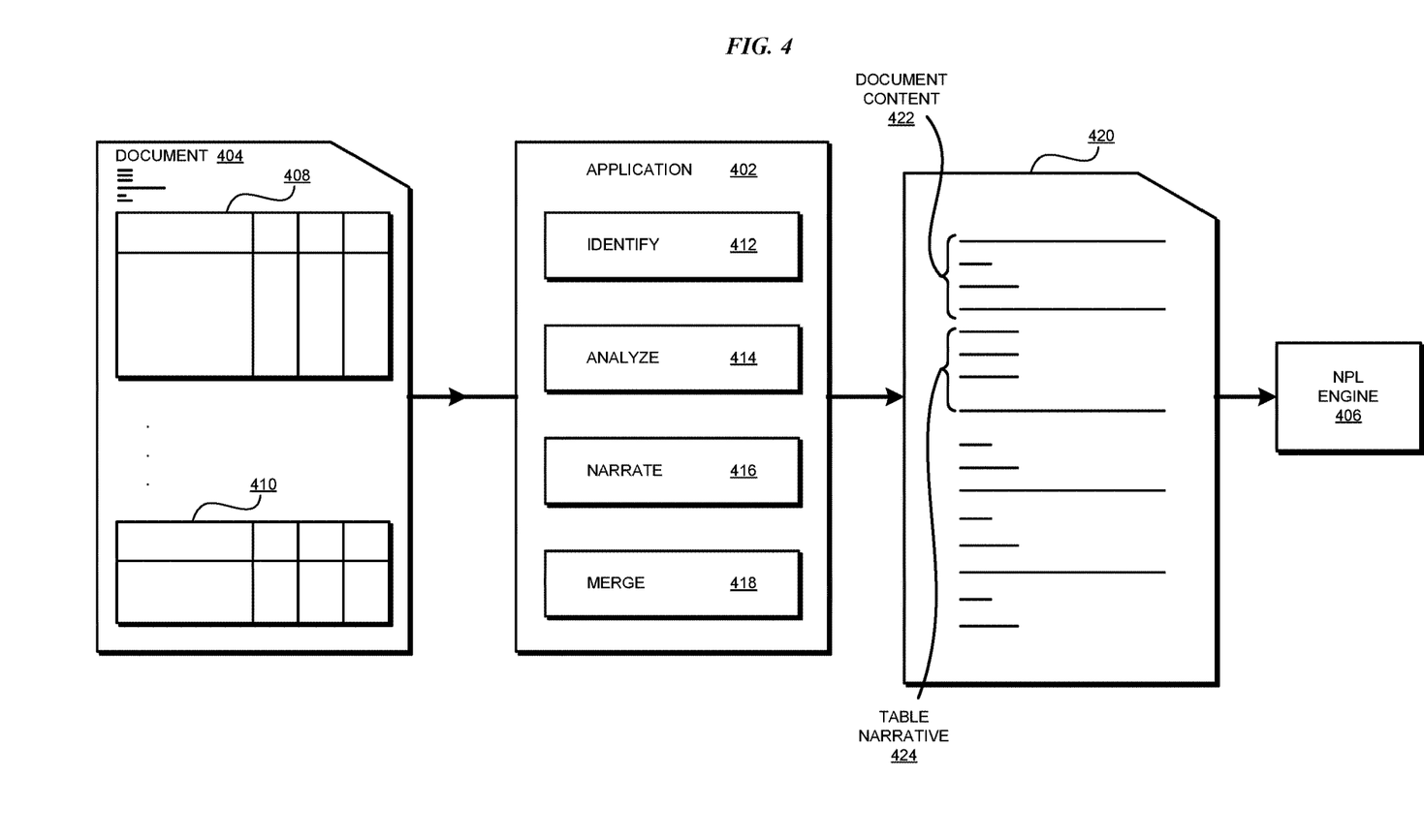
FIG. 4 depicts a block diagram of an example configuration for adapting tabular data for narration in accordance with an illustrative embodiment.

With reference to FIG. 4, this figure depicts a block diagram of an example configuration for adapting tabular data for narration in accordance with an illustrative embodiment. Application 402 is an example of application 105 in FIG. 1. Document 404 is an example of document with tabular data 113 in FIG. 1. NLP engine 406 is an example of NLP engine 103 in FIG. 1.

Document 404 includes a set of tabular data instances, such as tables 408 and 410. Document 404 can include any number of tabular data instances without limitation. As an example, and without implying a limitation on the illustrative embodiments, assume that table 408 is similar to table 302 in FIG. 3.

Application 402 includes component 412, which identifies the presence of tabular data instances in document 404. For example, in one embodiment, component 412 identifies table 408 by the presence of visual grid markings, indentations, document markup tags such as HTML tags, or a combination thereof. In another embodiment, component 412 identifies table 408 by a reference in document 404 which indicates that the part of document 404 occupied by table 408 includes tabular data.

These example ways of identifying the presence of tabular data are not intended to be limiting on the illustrative embodiments. Many other ways for similar identification will be apparent from this disclosure to those of ordinary skill in the art and the same are contemplated within the scope of the illustrative embodiments.

Application 402 further includes component 414, which analyzes the identified tabular data in document 404. For example, in one embodiment, and without implying a limitation thereto, component 414 analyzes table 408 in a manner similar to the analytic process described with respect to FIG. 3.

Application 402 also includes component 416, which generates the narrative text for the analyzed tabular data. For example, in one embodiment as described with respect to cell 324 in FIG. 3, for a cell in table 408, component 416 generates the following narrative—"Taxes are a part of revenues for Jefferson County. The General Government Fund has sixty one thousand and fifty dollars in revenues from taxes."

Optionally, application 402 includes component 418, which merges the narrative produced by component 416 into document 420. In one embodiment, as shown, document 420 includes content 422, which corresponds to non-tabular data from document 404, and table narrative 424, which, for example, corresponds to the narrative for table 408 generated by component 416 and merged with content 422 by component 418. Document 420 then serves as an input for further processing, such as an input to NLP engine 406. An embodiment can also output document 420 for other purposes such as, for example, audio conversion for the blind.

In another embodiment, component 418 does not merge table narrative 424 with content 422, but provides table narrative 424 via another document or input to NLP engine 406. For example, in such an embodiment, component 418 stores table narrative 424 in storage 108 in FIG. 1, and NLP engine 406 extract the stored narrative from storage 108 in FIG. 1 as an input for processing document 404.

Figure 5:
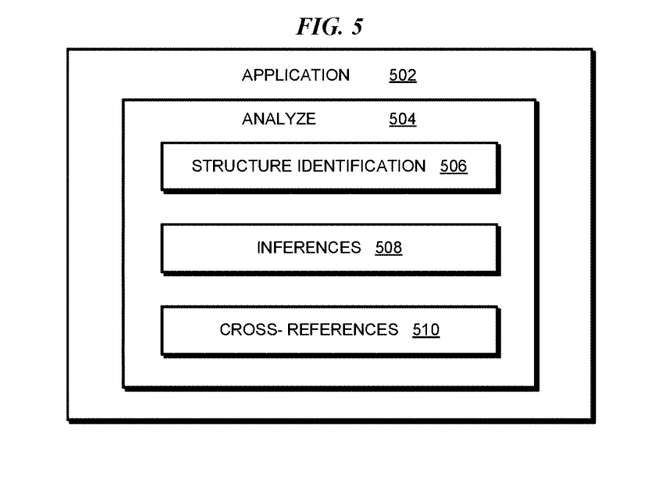
FIG. 5 depicts a block diagram of an example analysis component in an application for adapting tabular data for narration in accordance with an illustrative embodiment.

With reference to FIG. 5, this figure depicts a block diagram of an example analysis component in an application for adapting tabular data for narration in accordance with an illustrative embodiment. Application 502 is an example of application 402 in FIG. 4. Component 504 is an example embodiment of component 414 in FIG. 4.

To describe the operation of component 504 using sub-components 506, 508, and 510, assume that component 504 is analyzing table 302 of FIG. 3. Generally, for creating a narrative transformation of tabular data, an embodiment employs a variety of analysis techniques. For example, component 506 according to an embodiment recognizes the hierarchical structure formed under headers 304-310 by using offsets, indentation, relative positioning, font size or type, or other indicators of the relationships between header 304 and headers 306-310. Component 506 further recognizes that the rows indented under header 312 are to be interpreted as sub-categories of the category associated with header 312. In another embodiment, component 506 recognizes one or more hierarchies in table 302 by analyzing the wording of the headers, which can indicate relationships among the headers.

As a part of structure identification, component 506 also recognizes that cells in columns under headers 306, 308, and 310, respectively, all inherit symbols 318, 320, and 322.

Component 508 draws inferences from the structure identified by component 506. For example, in one embodiment, component 508 uses type specialization to determine the significance of a cell-value. For example, a cell "is", "is a", "includes", or "comprises" a particular type of data. Component 508 also uses aggregation relationships to draw inferences about inter-relationships between cells of a given tabular data. For example, a cell is a "part of", "is for", "used to", or "contributes" to a category or group of information.

As an example using table 302 in FIG. 3, component 508 considers header 304 in FIG. 3 and infers that header 304 implies 'types of Government Fund.' Component 508 then either finds a given type of government fund as already encountered in the given document set, or recognizes an occurrence of a type of government fund and saves the recognized occurrence for future use in the document set. Thus, when an NLP engine generates the narratives for individual fund types in a document, the narratives are much more detailed or comprehensive, e.g., 'Special Revenue is a Government Fund', which is not possible via presently available natural language processing technology.

Component 508 also uses language-dependent grammatical rules and constructs for drawing inferences. For example, in table 302 of FIG. 3, because "Taxes" and "Revenues" are both nouns, arranged relative to one another as depicted, an embodiment infers that taxes are "a kind of" revenue. Conversely, an embodiment infers that revenues "include" taxes, licenses, permits, intergovernmental [funds], charges for services, indirect cost recovery, investment income, and miscellaneous [funds]. An embodiment can also infer that revenue "includes" or "is" any of these sub-categories. Accordingly, cells and cell-values corresponding to any of these sub-categories "contribute to" the revenues category. Conversely, a cell value in any of these sub-categories "is a" revenue data.

Component 510 cross-references a combination of non-tabular and tabular contents of a document. For example, as described with respect to FIG. 3, some content in a given document may indicate that table 302 relates to the finances of "Jefferson County." Component 510 cross-references such contextual information, document-related or domain-specific lexicon, and cross-referencing heuristics to further describe the tabular data of table 302 in narrative form.

In one embodiment, the tabular data may not be limited to just two dimensions of rows and columns but be n-dimensional. One way of representing n-dimensional tabular data is to represent the n dimensions in several tables, each table using a different combination of two out of the n dimensions. In such a case, component 510 cross-references table artifacts, dependencies, cell relationships, and hierarchies across two or more tables in the n-dimensional tabular data.

An embodiment generates narrations that can be used to build and/or enrich industry-specific, client-specific, domain-specific, or document set-specific lexicons, taxonomies, ontologies, and heuristics to assist in future transformations.

The categorical inferences and heuristics are usable for cross-referencing non-tabular data and tabular data in a document to draw accurate and comprehensive inferences. The categorical inferences and heuristics are also usable in conjunction with additional operations with respect to documents, for example, for spell-checking in a document, or for validating the accuracy of another transformation, such as optical character recognition or language translation.

The examples used in describing the operations of the various components and sub-components in the various embodiments are only selected for the clarity of the description and are not intended to be limiting on the illustrative embodiments. Those of ordinary skill in the art will be able to conceive from this disclosure many other manners of structure identification, inference deduction, and cross-referencing, and the same are contemplated within the scope of the illustrative embodiments.

Figure 6:
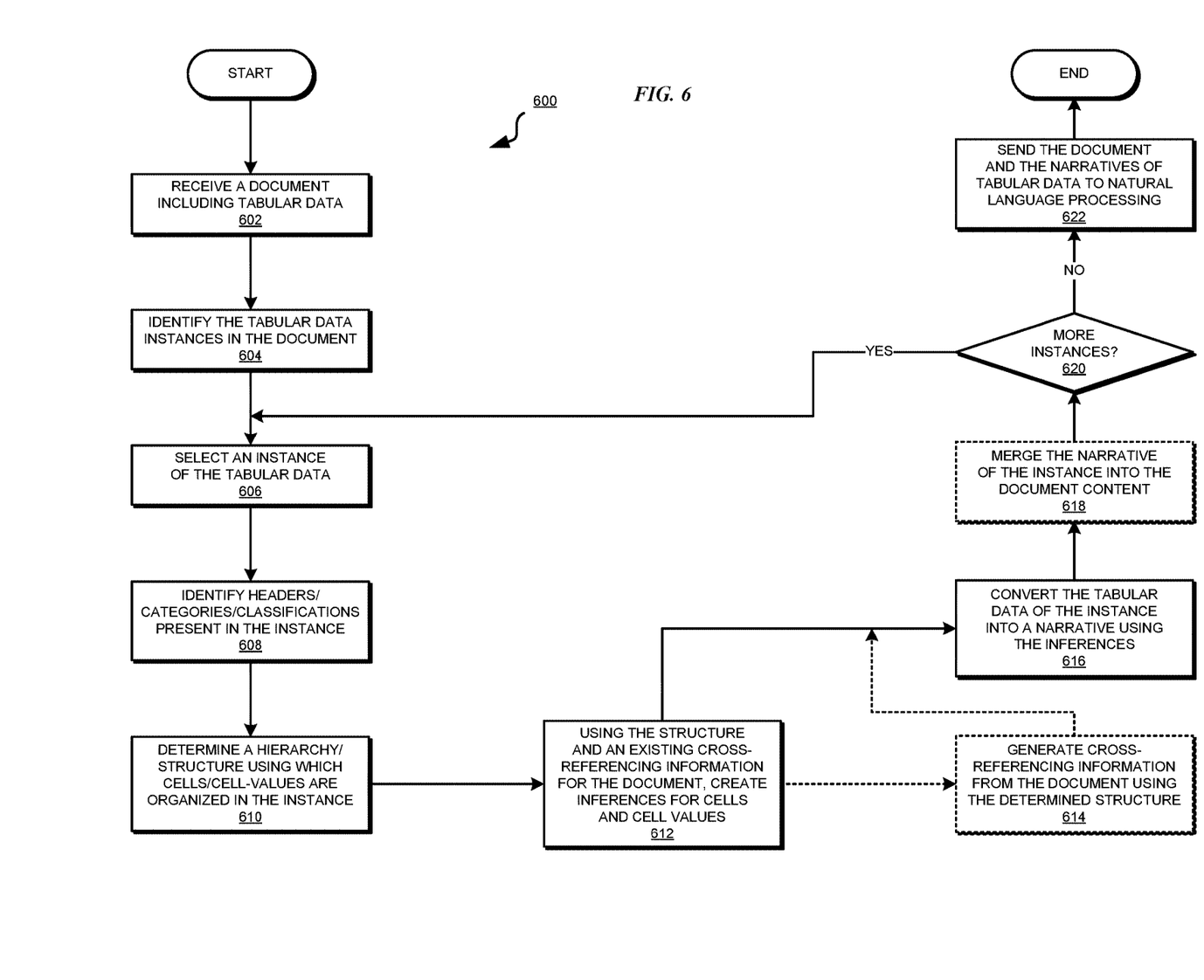
FIG. 6 depicts a flowchart of an example process for adapting tabular data for narration in accordance with an illustrative embodiment.

With reference to FIG. 6, this figure depicts a flowchart of an example process for adapting tabular data for narration in accordance with an illustrative embodiment. Process 600 can be implemented in application 402 in FIG. 4 or application 502 in FIG. 5.

Process 600 begins by receiving a document that includes a set of one or more tabular data instances (step 602). Process 600 identifies the tabular data instances in the document (step 604).

Process 600 selects an instance from the tabular data instances for transforming into narrative text (step 606). Process 600 identifies the headers, categories, or classifications present in the instance (step 608). Process 600 determines a hierarchy or structure using which the cells and cell-values are organized in the instance (step 610).

Using the determined structure and existing cross-referencing information for the document, process 600 creates inferences for cells and the cell-values (step 612). Optionally, process 600 may also generate cross-referencing information from the document based on the determined structure of tabular data in the document (step 614). Such generated cross-referencing information may be used in step 612 of another iteration of process 600 for adapting tabular data in another document for NLP processing.

Process 600 converts or transforms the tabular data of the instance into a narrative form using the inferences (step 616). Process 600 may optionally merge the narrative of the tabular data into the document with other non-tabular content of the document (step 618).

Process 600 determines whether more instances of tabular data remain to be processed in the document (step 620). If more instances remain ("Yes" path of step 620), process 600 returns to step 606. If no more instances of tabular data remain in the document for transforming into the narrative form ("No" path of step 620), process 600 sends the document and the narratives of the tabular data to a NLP engine (step 622). Process 600 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for adapting tabular data for narration. An embodiment recognizes the hierarchical organization of data in a tabular presentation by identifying one or more hierarchies across rows and columns of the tabular presentation. An embodiment relates the data in the tabular presentation of a document to the rest of the document, with other tabular presentations in the document, with data in other documents, or a combination thereof.

An embodiment can also relate data from various instances of tabular data in a document to create an inferential narrative. For example, if one tabular presentation pertains to revenue information and another tabular information pertains to expenses information, an embodiment can draw inferences and generate a narrative of a balance sheet even if a balance sheet is not present in the document in tabular form.

In one embodiment, inferential narratives can be based on information present in a defined surrounding area around tabular data. For example, if one tabular data is described in a document as containing expenses information, and another tabular data is described in the document as containing income information, the embodiment can utilize preconfigured logic to combine the information from the two tabular data into an inferential narrative of a balance sheet, even if one is not present in the document.

In another embodiment, inferential narratives can be based on cell placement in tabular data. For example, certain cells can be placed in a sales column and certain other cells can be present in a cost of goods column in a given tabular data. The embodiment can utilize preconfigured logic to combine the information from the cells in such cell placements into an inferential narrative of a profit and loss statement, even if one is not present in the document.

Other embodiments can similarly utilize logic based on proximity of tabular data or cells, meanings of words used in tabular data, information available in a given document about the tabular data contained therein, or a combination of these and other techniques described above. An embodiment can used the logic of any combination of these and other similarly purposed techniques for analyzing a given document at large and creating inferential narratives.

An embodiment generates the narrative form of tabular data without using narrative sentence templates. Instead of treating a row of a table as a complete record and generating a narrative for the entire row record, an embodiment treats each cell individually and considers the cell-values relative to their location in a hierarchy of the tabular data to generate a narrative according to the significance of the cell.

An embodiment also generates cross-referencing information that is usable for natural language processing of the content of the document as a whole. For example, if the term "taxes" appear in other parts of the document that includes an example table as described herein, an embodiment provides the cross-referencing information that taxes are a type of revenue. Such information is useful in generating a natural language output that is of greater accuracy and completeness than possible without the use of an embodiment. This information provides additional insights for an NLP engine and is useful for processing the current document and elsewhere.

An embodiment can generate a narrative of a cell or a header in a table even if the cell or the header contains no value. For example, a row that includes only a header cell can still be transformed into a narrative. As an example, an embodiment finds headers "governmental fund types", "general", "special revenue", and "debt service" in an example table described herein and generates the narrative, "General, Special Revenue, and Debt Service are kinds of Governmental Fund" even when no cell-values, such as dollar amounts, are associated with the header cells themselves.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for adapting tabular data for narration, the method comprising:

identifying, in a first tabular portion of a document, a set of categories used to organize data;

drawing, by analyzing an arrangement of the categories, an inference of inclusion between a plurality of clauses of a table corresponding to a plurality of categories in the arrangement, the inference using the categories to determine that one clause in the plurality of clauses includes another clause in the plurality of clauses according to a natural language-dependent grammatical rule;

connecting the plurality of clauses, the connecting forming a narrative statement according to linguistic dependencies between the plurality of clauses;

drawing an inference about data in a first cell in the first tabular portion based on a position of the first cell in the arrangement; and transforming the first tabular portion of the document into a first narrative form using the inference about the data, wherein the first narrative form uses the narrative statement.

2. The method of claim 1, wherein the transforming comprises:
creating an inferential narrative, wherein the inferential narrative comprises inferences drawn using cells in different tabular portions of the document, the inferential narrative describing content not present in the different tabular portions.

3. The method of claim 1, wherein the transforming generates the first narrative form without using a template for a narrative sentence, and wherein the transforming comprises:
determining a significance of the first cell relative to the first tabular data based on the position of the first cell in the arrangement; and
generating a part of the first narrative form using the determined significance of the first cell.

4. The method of claim 3, wherein the first cell does not include a value, wherein the first cell specifies a category, and wherein the first narrative form describes the category in the first cell.

5. The method of claim 1, wherein the drawing the inference about the data further comprises:
cross-referencing the data in the first cell with data in a second cell in the first tabular portion.

6. The method of claim 5, wherein the cross-referencing further comprises:
using cross-referencing information created during transforming a second document.

7. The method of claim 1, wherein the drawing the inference about the data further comprises:
cross-referencing the data in the first cell with data in a non-tabular portion of the document.

8. The method of claim 1, further comprising:
merging the first narrative form corresponding to the first tabular portion with a non-tabular portion of the document.

9. The method of claim 1, further comprising:
sending the narrative form of the first tabular portion of the document and a non-tabular portion of the document to a natural language processing engine.

10. The method of claim 1, further comprising:
receiving the document, the document including a plurality of tabular portions, the first tabular portion being one of the plurality of tabular portions, each tabular portion organizing data using a different set of categories.

11. A computer usable program product comprising a computer usable storage device including computer usable code for adapting tabular data for narration, the computer usable code comprising:
computer usable code for identifying, in a first tabular portion of a document, a set of categories used to organize data;
computer usable code for drawing, by analyzing an arrangement of the categories, an inference of inclusion between a plurality of clauses of a table corresponding to a plurality of categories in the arrangement, the inference using the categories to determine that one clause in the plurality of clauses includes another clause in the plurality of clauses according to a natural language-dependent grammatical rule;
computer usable code for connecting the plurality of clauses, the connecting forming a narrative statement according to linguistic dependencies between the plurality of clauses;
computer usable code for drawing an inference about data in a first cell in the first tabular portion based on a position of the first cell in the arrangement; and
computer usable code for transforming the first tabular portion of the document into a first narrative form using the inference about the data, wherein the first narrative form uses the narrative statement.

12. The computer usable program product of claim 11, wherein the computer usable code for transforming comprises:
computer usable code for creating an inferential narrative, wherein the inferential narrative comprises inferences drawn using cells in different tabular portions of the document, the inferential narrative describing content not present in the different tabular portions.

13. The computer usable program product of claim 11, wherein the computer usable code for transforming generates the first narrative form without using a template for a narrative sentence, and wherein the computer usable code for transforming comprises:
computer usable code for determining a significance of the first cell relative to the first tabular data based on the position of the first cell in the arrangement; and
computer usable code for generating a part of the first narrative form using the determined significance of the first cell.

14. The computer usable program product of claim 13, wherein the first cell does not include a value, wherein the first cell specifies a category, and wherein the first narrative form describes the category in the first cell.

15. The computer usable program product of claim 11, wherein the computer usable code for drawing the inference about the data further comprises:
computer usable code for cross-referencing the data in the first cell with data in a second cell in the first tabular portion.

16. The computer usable program product of claim 15, wherein the computer usable code for cross-referencing further comprises:
computer usable code for using cross-referencing information created during transforming a second document.

17. The computer usable program product of claim 11, wherein the computer usable code for drawing the inference about the data further comprises:
computer usable code for cross-referencing the data in the first cell with data in a non-tabular portion of the document.

18. The computer usable program product of claim 11, further comprising:
  computer usable code for merging the first narrative form corresponding to the first tabular portion with a non-tabular portion of the document.

19. The computer usable program product of claim 11, further comprising:
  computer usable code for sending the narrative form of the first tabular portion of the document and a non-tabular portion of the document to a natural language processing engine.

20. The computer usable program product of claim 11, further comprising:
  computer usable code for receiving the document, the document including a plurality of tabular portions, the first tabular portion being one of the plurality of tabular portions, each tabular portion organizing data using a different set of categories.

21. The computer usable program product of claim 11, wherein the computer usable code is stored in a computer readable storage device in a data processing system, and wherein the computer usable code is transferred over a network from a remote data processing system.

22. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

23. A data processing system for adapting tabular data for narration, the data processing system comprising:
  a storage device including a storage medium, wherein the storage device stores computer usable program code; and
  a processor, wherein the processor executes the computer usable program code, and wherein the computer usable program code comprises:
  computer usable code for identifying, in a first tabular portion of a document, a set of categories used to organize data;
  computer usable code for drawing, by analyzing an arrangement of the categories, an inference of inclusion between a plurality of clauses of a table corresponding to a plurality of categories in the arrangement, the inference using the categories to determine that one clause in the plurality of clauses includes another clause in the plurality of clauses according to a natural language-dependent grammatical rule;
  computer usable code for connecting the plurality of clauses, the connecting forming a narrative statement according to linguistic dependencies between the plurality of clauses;
  computer usable code for drawing an inference about data in a first cell in the first tabular portion based on a position of the first cell in the arrangement; and
  computer usable code for transforming the first tabular portion of the document into a first narrative form using the inference about the data, wherein the first narrative form uses the narrative statement.

24. The data processing system of claim 23, wherein the computer usable code for transforming comprises:
  computer usable code for creating an inferential narrative, wherein the inferential narrative comprises inferences drawn using cells in different tabular portions of the document, the inferential narrative describing content not present in the different tabular portions.

25. The data processing system of claim 23, wherein the computer usable code for transforming generates the first narrative form without using a template for a narrative sentence, and wherein the computer usable code for transforming comprises:
  computer usable code for determining a significance of the first cell relative to the first tabular data based on the position of the first cell in the arrangement; and
  computer usable code for generating a part of the first narrative form using the determined significance of the first cell.

* * * * *